United States Patent
Gorniak

(10) Patent No.: US 6,702,350 B1
(45) Date of Patent: Mar. 9, 2004

(54) BOLTED AXLE WHEEL ASSEMBLY

(75) Inventor: Theodore S. Gorniak, North East, PA (US)

(73) Assignee: Ridg-U-Rak, Inc., North East, PA (US)

( * ) Notice: Subject to any disclaimer, the term of this patent is extended or adjusted under 35 U.S.C. 154(b) by 0 days.

(21) Appl. No.: 10/065,116

(22) Filed: Sep. 18, 2002

(51) Int. Cl.[7] .......................... B60B 37/00; B60B 23/06; B60B 27/02; B61F 5/26

(52) U.S. Cl. .................... 295/43; 301/114; 301/111.07; 105/218.1

(58) Field of Search .................. 295/1, 43 I; 301/5.301, 301/5.305, 5.7, 111.01, 114, 111.07, 111.03; 411/82.2, 209, 216, 217; 105/96, 218.1, 220, 221.1, 221.2

(56) References Cited

U.S. PATENT DOCUMENTS

| | | | |
|---|---|---|---|
| 1,203,800 A | * 11/1916 | Slick | 295/24 |
| 2,837,376 A | * 6/1958 | Bruno | 301/5.301 |
| 3,406,416 A | 10/1968 | Presby et al. | 15/1.7 |
| 3,602,150 A | * 8/1971 | Frost et al. | 104/172.4 |
| 4,219,240 A | * 8/1980 | Brandenstein et al. | 301/5.7 |
| 4,603,025 A | * 7/1986 | Landay et al. | 301/5.7 |
| 4,919,491 A | 4/1990 | Heideman | 301/124 |
| 5,012,575 A | 5/1991 | Heideman | 29/894.3 |
| 5,065,567 A | 11/1991 | Wessel et al. | 56/13.7 |
| 5,356,209 A | 10/1994 | Hill | 301/5.7 |
| 5,443,277 A | * 8/1995 | Kubierschky | 280/11.223 |
| 5,609,108 A | * 3/1997 | Chapman | 105/170 |
| 5,823,293 A | * 10/1998 | Gilbertson et al. | 301/5.7 |
| 5,853,227 A | 12/1998 | Schmidt, III | 301/5.7 |
| 6,269,992 B1 | 8/2001 | Miller | 224/407 |

OTHER PUBLICATIONS

General Electric Company, Alloy Steel Self–Locking Cap Screw Specification Sheet, Oct. 31, 1991.

* cited by examiner

Primary Examiner—S. Joseph Morano
Assistant Examiner—Jason R. Bellinger
(74) Attorney, Agent, or Firm—Edward W. Goebel, Jr.; Jon L. Woodard; MacDonald, Illig, Jones & Britton LLP

(57) ABSTRACT

A wheel and axle assembly for a material handling cart has a wheel with a bearing and an axle that extends through the bearing. The axle has a bolt cavity with female cavity threads and an inside tapered portion. A bolt having male bolt threads and an outside tapered portion engages the female cavity threads. The head of the bolt has a head diameter that is greater than the inside diameter of the bearing and therefore locks the bolt in position. When the outside tapered portion of the bolt contacts the inside tapered portion of the bolt cavity, the head of the bolt locks the bearing against a shoulder of the axle. To prevent the bolt from loosening its engagement with the bolt cavity, a locking material is added to the male threads of the bolt.

9 Claims, 6 Drawing Sheets

BOLTED AXLE WHEEL ASSEMBLY

BACKGROUND OF INVENTION

The invention relates to a wheel and axle assembly for securing a wheel in position on a material handling cart used for a material handling cart and rack system.

In industrial and heavy commercial duty applications such as material handling cart and storage rack systems, load-bearing wheels are routinely subjected to shocks and wear from repeated usage, sudden applications of heavy loads, and collisions with various objects. These conditions can both occur suddenly and gradually and can lead to the loosening or disconnection of cart wheels. When any one wheel on a given cart is loosened or becomes disconnected from the cart, both that cart and any other cart or carts associated with it may become inoperable and may need to be removed from service until a repair can be made. This may lead to the incurring of significant expenses for the operator due to the costs of repairs, down time, and the inaccessibility of stored items.

The development of improved cart and storage rack systems has also led to the development of efficient space-saving techniques for positioning multiple carts in confined or restricted spaces. For example, in the case of pushback storage rack systems, such as that disclosed in U.S. patent application Ser. No. 09/971,752 filed on Oct. 4, 2001, improvements in design have enabled significant increases in the numbers of wheeled storage rack carts that can be stacked for use in a single storage rack lane. Although such innovations have made it possible to significantly increase the number of available carts in a system, and have therefore increased the number of loads that can be stored in a restricted space, such innovations have also meant that more cart wheels must be accommodated in spaces that are no less restricted than in previous designs.

For this reason, it has become increasingly important that assemblies for mounting wheels on material handling carts be configured to occupy a minimum amount of space. However, it has become equally important that wheel assemblies be configured to minimize the likelihood that a cart wheel on any given cart will loosen or become disconnected, even when the wheel or cart is subjected to extreme operating conditions.

SUMMARY OF INVENTION

The invention is a wheel and axle assembly for a material handling cart in which a cart wheel is fastened into position with a bolt that is itself secured in place with an appropriate locking material. The wheel has an inner hole which extends through the wheel and which defines an inner wheel surface. A first bearing is positioned within the hole and has an outer race which engages the inner wheel surface and an inner race which rotates with respect to the outer race. A snap ring locks the first bearing in position within the inner hole of the wheel.

An axle extends through the bearing and has a rolled bearing engagement surface that engages the inner race of the bearing. The axle has a shoulder which has a greater axial radius than the bearing engagement surface and which contacts the bearing. The axle also has a rolled load bearing surface which connects the wheel and axle assembly to the cart or load. The axle has a bolt cavity that has female cavity threads within it and an inside tapered portion at one end of the female cavity threads. A bolt having male bolt threads and a head with an outside tapered portion engages the female cavity threads and can be screwed into the bolt cavity until the outside tapered portion of the bolt contacts the inside tapered portion of the bolt cavity. The head of the bolt has a head diameter that is greater than the inside diameter of the race of the bearing. Thus, when the head of the outside tapered portion of the bolt contacts the inside tapered portion of the bolt cavity, the head of the bolt engages the inner race to axially lock the bearing against the shoulder of the axle.

To prevent the bolt from disconnecting or loosening its engagement with the bolt cavity of the axle, a locking material is added to the male threads of the bolt. In some embodiments of the invention, the locking material can comprise a strip made of nylon or other resilient material that is inserted into a strip cavity located at or near the male threads of the bolt. In other embodiments of the invention, the locking material can comprise a chemical locking compound or other material applied directly to the surfaces of the male threads. The locking material secures the male threads of the bolt in engagement with the female threads of the bolt cavity so that the outside tapered portion of the bolt remains in contact with the inside tapered portion of the bolt cavity.

Those skilled in the art will realize that this invention is capable of embodiments which are different from those shown and that details of the structure of the wheel and axle assembly described herein can be changed in various manners without departing from the scope of this invention. Accordingly, the drawings and descriptions are to be regarded as including such equivalent wheel and axle assemblies as do not depart from the spirit and scope of this invention.

BRIEF DESCRIPTION OF DRAWINGS

For a more complete understanding and appreciation of this invention and many of its advantages, reference will be made to the following detailed description taken in conjunction with the accompanying drawings.

DETAILED DESCRIPTION

Figure 1:
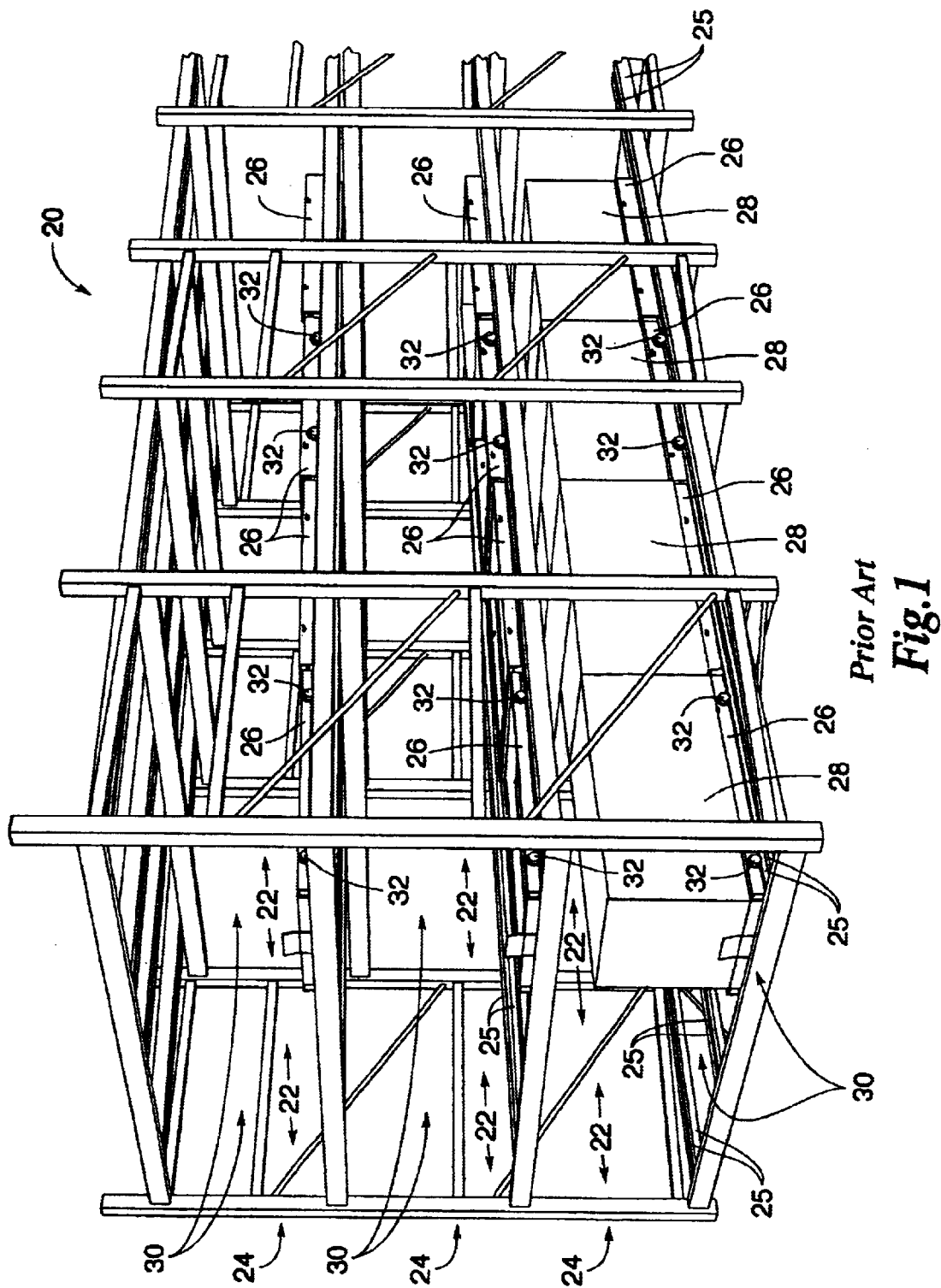
FIG. 1 is a perspective view of an example of a material handling cart and rack system.

Referring to the drawings, identical reference numerals designate the same or corresponding parts throughout the several figures shown in the drawings.

Figure 2:
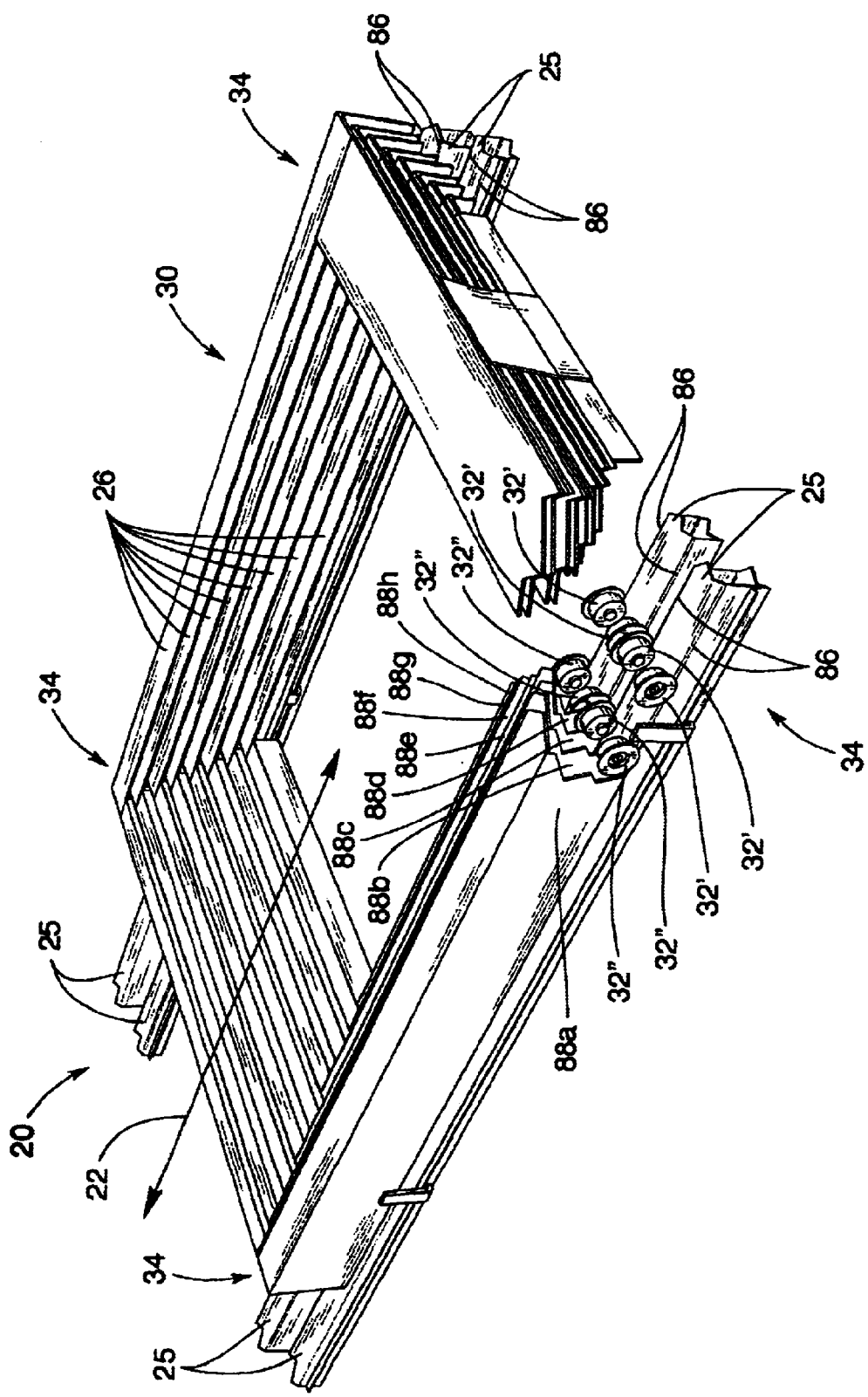
FIG. 2 is a perspective view of an example of multiple stacked carts used for material handling in a cart and rack system.
Figure 3:
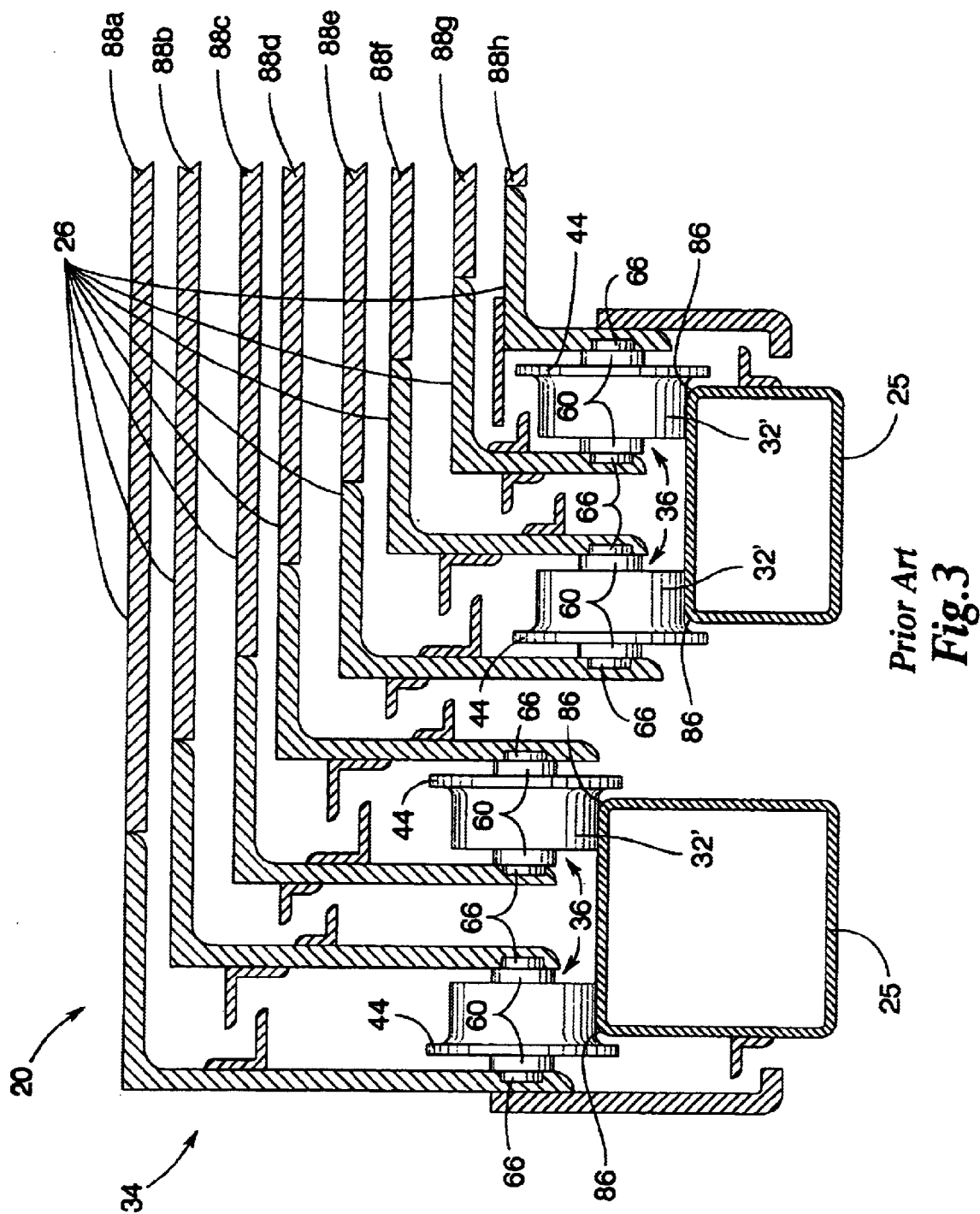
FIG. 3 is a cross sectional front view of the multiple stacked carts of FIG. 2.

The invention can be incorporated into complex material handling systems such as the cart and rack system 20 depicted in FIGS. 1–3. Such systems typically include multiple cart lanes 22 which can be positioned on multiple levels 24. The cart lanes 22 are normally defined by tubes 25 extending along the length of each cart lane 22 which serve as tracks for multiple material handling carts 26 that occupy each cart lane 22. Each cart 26 is capable of accommodating an individual load 28. The tubes 25 of the cart lanes 22 are typically upwardly inclined from a loading end 30. This inclined configuration of each cart lane 22 biases the carts 26 to move toward the loading end 30 so that when unloaded, the carts 26 will stack on top of each other at the loading end 30 as shown in FIG. 2.

Loads 28 are normally added to the system 20 at the loading end 30 of each cart lane 22. When a load 28 is added to a particular cart lane 22, any previously added load 28 in the lane is pushed on its cart 26 away from the loading end 30 to a higher position on the tubes 25. When a load 28 is removed and a cart 26 is unloaded, the next higher cart 26 slides into the loading end 30 and over the next lower unloaded cart 26. The loaded cart 26 can experience a bumping shock as it is stopped at the loading end 30 of the cart lane 22. This unloading process continues until all the carts 26 are unloaded and stacked at the loading end 30 as shown in FIG. 2.

During use, carts 26 are continually subjected to stresses from the weight, loading, and unloading of loads 28, from the bumping shocks of being stopped at the loading end 30 of a cart lane 22, and from other sources associated with heavy duty and heavy load bearing environments. However, if a wheel 32' or 32" on any given cart 26 were to loosen or become disconnected from the cart 26 and cause the cart 26 to become inoperable, the operation and use of the entire cart lane 22 could be disrupted.

Referring to the eight stacked carts 26 depicted in FIGS. 2 and 3, each cart 26 includes four wheels 32' and 32", with each wheel 32' and 32" occupying a position in one of four corner areas 34 when the carts 26 are stacked at the loading end 30 of the cart lane 22. The system 20 must therefore be configured to allow for the positioning of eight separate cart wheels 32' and 32" at each corner area 34. As best understood with reference to the front cross sectional view of one corner area 34 in FIG. 3, each wheel 32' and 32" must also be positioned to allow for the relatively tight positioning of various structural components associated with a large number of carts 26.

Although the invention is shown and described in the context of a stacked cart or "push back" style of material handling system, it will be appreciated that the disclosed wheel and axle assembly can be used with many different types of material handling systems and that the use of the disclosed wheel and axle assembly with such other types of material handling systems is contemplated to be within the scope of the invention.

Figure 4A:
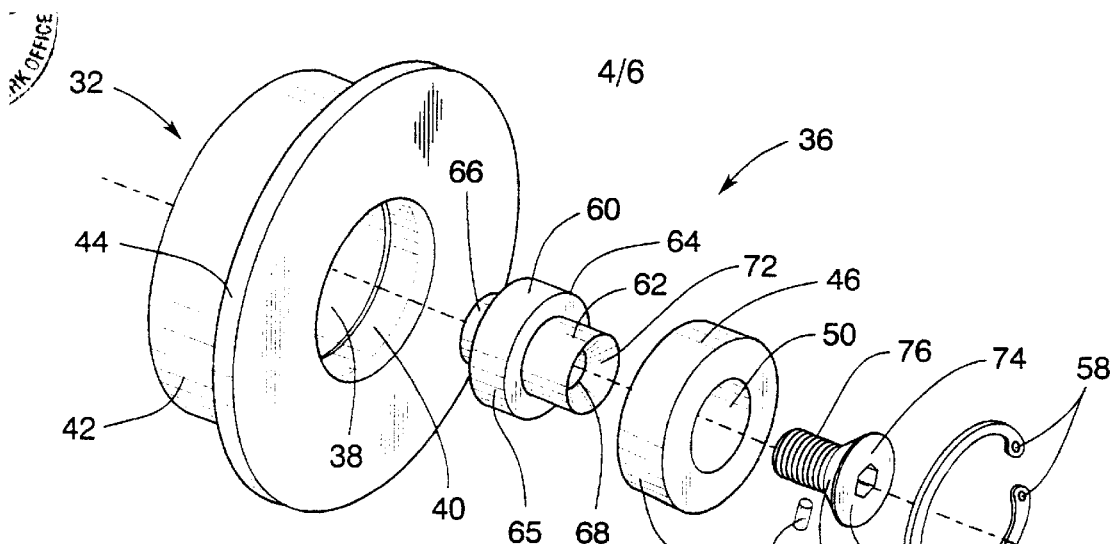
FIG. 4A is an exploded perspective view of a wheel and axle assembly according to an embodiment of the invention.

FIG. 4A is an exploded view of a single-bearing wheel and axle assembly 36 of the invention. The wheel 32 has an inner hole 38 extending through the wheel 32 which defines an inner wheel surface 40. The wheel 32 also has an outer rolling surface 42 and a positioning flange 44 extending outwardly from the outer rolling surface 42. The positioning flange 44 allows the wheel 32 to engage one of the tubes 25 and align the cart 26 properly in a cart lane 22 as shown in FIG. 1.

Referring again to FIG. 4A, a first bearing 46 is positioned within the hole 38 of the wheel 32. The first bearing 46 includes an outer race 48 and an inner race 50 which is configured to spin freely with respect to the outer race 48. The outer race 48 engages the inner wheel surface 40 when the first bearing 46 is positioned within the hole 38 of the wheel 32. As best understood with reference to the cross sectional view of the assembled wheel assembly 36 depicted in FIG. 6A, when the first bearing 46 is installed, the outer race 48 rests against a bearing notch 52 located within the hole 38.

A snap ring 54 is also positioned within the hole 38 to lock the first bearing 46 in position against the bearing notch 52. The snap ring 54 is configured to engage and lock within a snap ring notch 56 located along the inner wheel surface 40 when the snap ring 54 locks the first bearing 46 in position. Referring again to the exploded view of FIG. 4A, the snap ring 54 can have a pair of compression holes 58 that allow for compression and installation of the snap ring 54 with an appropriate compression tool.

The inner race 50 of the first bearing 46 holds and positions an axle 60 at a rolled bearing engagement surface 62 with the axle 60 extending at least partially through the inner race 50. The axle 60 includes a shoulder 64 that is adjacent the bearing engagement surface 62 and which has an axial radius that is greater than that of the bearing engagement surface 62. The shoulder 64 is formed from the edge of a rolled barrel portion 65 of the axle 60 which has a larger axial radius than the bearing engagement surface 62. The axle 60 also includes a rolled load-bearing surface 66 that allows the axle 60 to connect to a cart 26 (shown in FIGS. 2 & 3) and bear loads. As shown in FIG. 7A, as well as FIG. 4A, bolt cavity 68 having female cavity threads 70 extends into the axle 60 and includes an inside tapered portion 72 at the end of the bolt cavity 68.

A bolt 74 is configured to engage and fasten the axle 60 to the wheel 32. The bolt 74 includes male bolt threads 76, a head 78, and a tapered portion 80 located at or near the head 78. The male bolt threads 76 are configured to engage the female cavity threads 70 of the axle 60, permitting the bolt 74 to be screwed into the axle 60 until the tapered portion 80 of the bolt 74 contacts the inside tapered portion 72 of the bolt cavity 68. This contact between tapered surfaces allows the bolt 74 to be fitted into the bolt cavity 68 with precision, preventing over tightening.

The radius of the head 78 of the bolt 74 is greater than that of the bearing engagement surface 62 of the axle 60. The radius of the head 78 is also greater than the radius with the inside surface of the inner race 50 of the first bearing 46. As best understood with reference to FIG. 6A, the bearing engagement surface 62 of the axle 60 extends through the inner race 50 of the first bearing 46 with the tapered portion 80 of the bolt 74 contacting the inside tapered portion 72 of the bolt cavity 68. Since the axial radius of the head 78 is greater that that of the bearing engagement surface 62 or that of the radius of the inside surface of inner race 50, the bolt 74 engages the inner race 50 to lock the first bearing 46 against the shoulder 64 of the axle 60. Since the first bearing 46 is already secured to the wheel 32 by the snap ring 54 and bearing notch 52, the locking of the first bearing 46 against the axle 60 also secures the axle 60to the wheel 32.

Figure 6B:
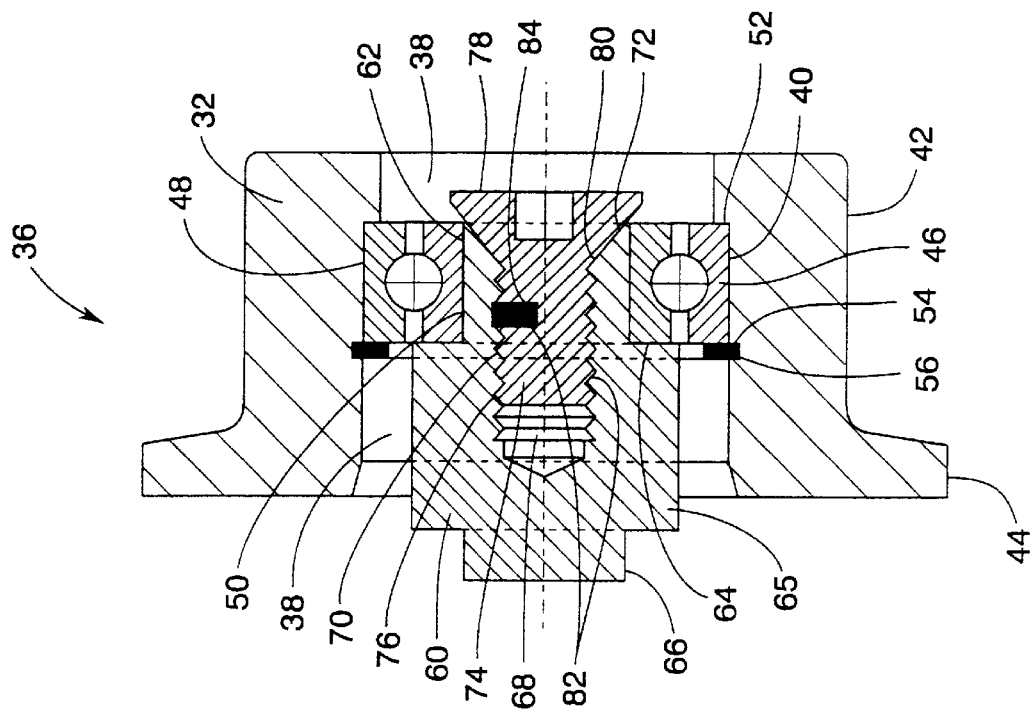
FIG. 6B is a cross sectional view of a wheel and axle assembly according to an embodiment of the invention.
Figure 6A:
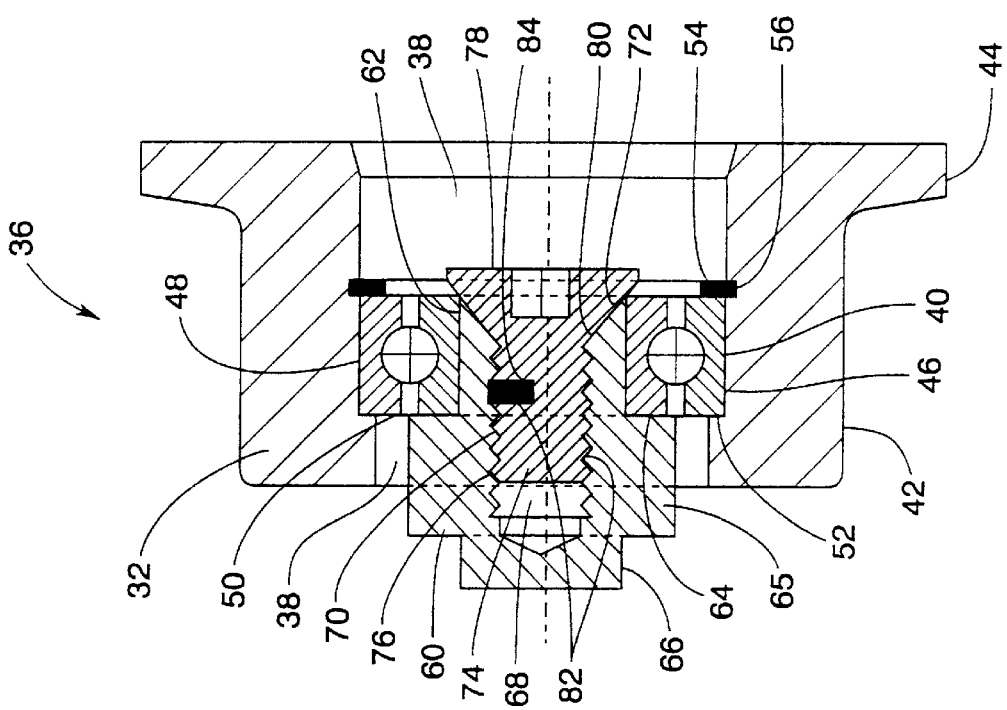
FIG. 6A is a cross sectional view of the wheel and axle assembly of FIG. 4A.

FIG. 6A depicts a locking material 82 positioned within a strip cavity 84 located at about the male bolt threads 76 of the bolt 74. As best understood by comparing FIG. 6A with FIG. 4A, the locking material 82 can comprise a cylindrical nylon strip 82 that engages the female cavity threads 70 of the axle 60 to further secure the bolt 74 in position and to prevent the outside tapered portion 80 of the bolt 74 from disengaging from the inside tapered portion 72 of the bolt cavity 68.

Although the locking material 82 is shown and described in FIGS. 4A and 6A as comprising a cylindrical nylon strip inserted into a strip cavity 84, it will be appreciated that other configurations and material compositions, each enabling locking to occur between the male bolt threads 76 and female cavity threads 70, are also possible and are contemplated to be within the scope of the invention.

Figure 5A:
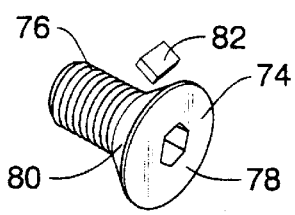
FIG. 5A is a perspective view of a bolt for use in a wheel and axle assembly according to an embodiment of the invention.

For example, FIG. 5A depicts a bolt 74 according to the invention in which the locking material 82 comprises a rectangular nylon strip, the strip cavity (not visible in FIG. 5A) having a box rather than cylindrical shape to accommodates the rectangular shape of the locking material 82. An existing bolt and locking material combination having this configuration is the Alloy Steel Self-Locking Cap Screw, Description: (C1A7E1) American National Standard flat head hex socket self-locking screw, which is available from the General Electric Company.

Figure 5B:
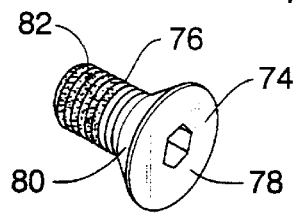
FIG. 5B is a perspective view of a bolt for use in a wheel and axle assembly according to an embodiment of the invention.

FIG. 5B depicts another bolt 74 according to the invention in which the locking material 82 comprises a chemical locking compound which is applied directly to the male bolt threads 76 of the bolt 74 prior to being screwed into the axle 60. The liquid locking compound can comprise a liquid threadlock, epoxy, hot melt, acrylic adhesive, high glue agent, silicone, or other suitable material that gums or otherwise impedes rotation of the bolt 74 within the bolt cavity 68 of the axle 60. Suitable liquid threadlock materials include Threadlocker 242 (removable grade) and Threadlocker 262 (permanent strength) liquid threadlocks which are available from Henkel Loctite Corporation. Suitable epoxy materials include J-B Weld which is available from J-B Weld Company. Suitable acrylic adhesives include SpeedBonder 324 which is available from Henkel Loctite Corporation.

As shown in FIG. 5B, the chemical locking compound of the locking material 82 can be applied around the entire circumference of the male bolt threads 76 to enable locking to occur along a relatively large threaded contact area between the bolt 74 and axle 60 which tends to maximize the effectiveness of locking it will be further appreciated that slight variations in the configuration of the wheel and axle assembly 36 of the invention can be incorporated to allow for specific positioning and load bearing requirements of different wheels. For example, referring again to FIGS. 2 and 3, the depicted cart and rack system 20 includes eight stackable carts 26 that are configured to move along a cart lane 22, with each cart 26 having four wheels 32 that travel on one of two pairs of tubes 25. Two wheels 32 from a given cart 26 ride near the same tube edge 86of a common tube 25. In order to accommodate eight carts 26 in the depicted cart and rack system 20, each cart 26 must share one tube edge 86 with the wheels 32 of one other cart 26.

For this reason, and as best understood with reference to the front cross sectional view of the stacked carts 26 in FIG. 3, each tube edge accommodates wheels 32 from one pair 88*a*–*b*, 88*c*–*d*, 88*e*–*f*, or 88*g*–*h* of vertically adjacent carts 26. To allow the independent movement of each cart 26 in a given pair 88*a*–*b*, 88*c*–*d*, 88*e*–*f*, or 88*g*–*h*, each wheel 32" of the lower carts 88*b*, 88*d*, 88*f*, and 88*h* must be mounted outside the profile of the load bearing structure of each of these carts, while each wheel 32" of the higher carts 88*a*, 88*c*, 88*e*, and 88*g* must be mounted within the profile of the load bearing structure of these carts. The positioning flange 44 of each wheel 32" or 32" of each cart must always be placed immediately adjacent the tube edge 86 against which these carts are aligned. Each wheel 32" or 32" must therefore be constructed to allow for the proper installation of the positioning flange 44.

It follows that for any given pair of cart 26, that is 88*a*–*b*, 88*c*–*d*, 88*e*–*f*, or 88*g*–*h*, the load bearing surface 66 of each axle 60 of the lower carts 8*b*, 88*d*, 88*f*, and 88*h* must extend inwardly and toward the center of each cart to enable the axle 60 to carry the load of the cart. It likewise follows that the load bearing surface 66 of each axle 60 of the higher carts 88*a*, 88*c*, 88*e*, and 88*g* of each pair must extend outwardly and away from the center of each cart.

However, the orientation of the wheel 32"41 or 32" i.e., whether the load bearing surface 66 of the wheel 32" or 32" is positioned toward or away from the center of the cart 26, is dependent on whether the wheel 32" or 32", including its flange 44, rides on an inside or outside tube edge 86. By way of example, the wheel and axle assembly 36 shown in FIGS. 6B and 6C, each having an axle 60 with its load bearing surfaces 66 on the flange side of the wheel 32, can be attached to lower carts 88*d* and 88*h* and to upper carts 88*a* and 88*e*. Additionally, the wheel and axle assemblies 36 shown in FIGS. 6A and 6D, each having an axle 60 with its load bearing surface 66 on the flat side of the wheel 32, can be attached to the lower carts 88*b* and 88*f* and to the upper carts 88*c* and 88*g*.

As suggested above, FIG. 6B is a cross sectional representation of a wheel and axle assembly 36 on which a load bearing surface 66 of the axle 60 is reversed with respect to the positioning flange 44 of the wheel 32 versus the arrangement shown in FIG. 6A. The axle 60 includes a barrel 65 that has a larger axial length than the barrel 65 depicted in FIG. 6A. As shown in FIGS. 6A and 6B, the first bearing 46 is typically positioned off of center along the axial length of the wheel 32. The larger axial length of the barrel 65 depicted in FIG. 6A allows for sufficient clearance to exist between the bearing engagement surface 62 of the axle 60 and the edge of the inner hole 38 of the wheel 32 which in turn permits unobstructed attachment to a cart 26.

Figure 4B:
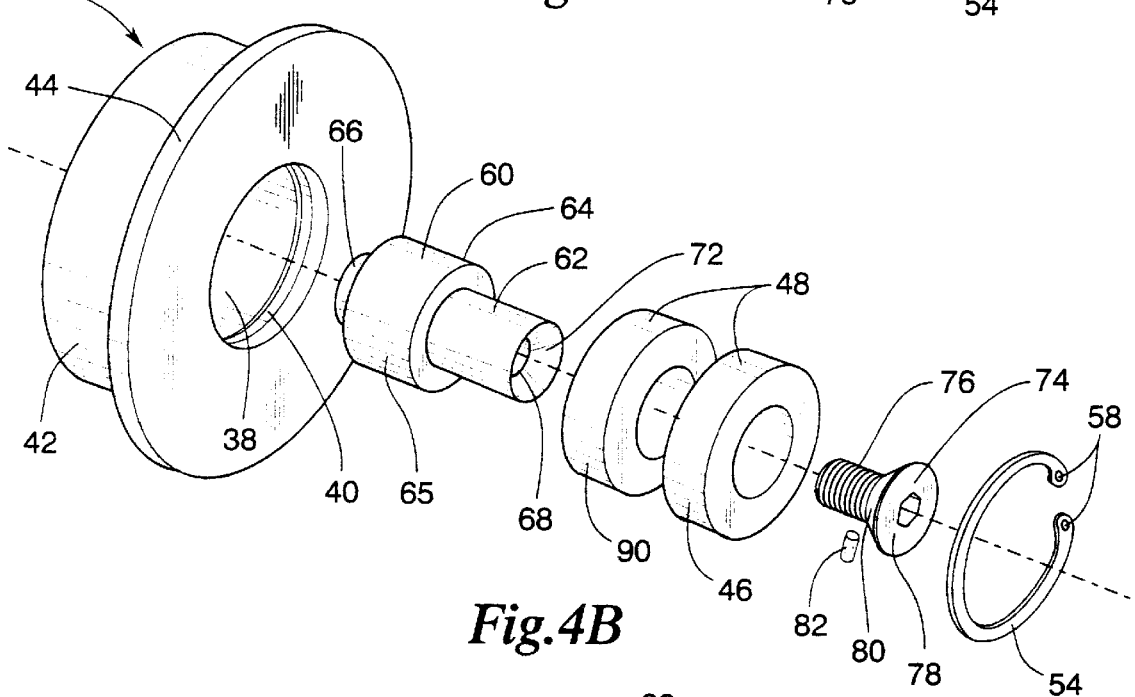
FIG. 4B is an exploded perspective view of a wheel and axle assembly according to an embodiment of the invention.
Figure 6C:
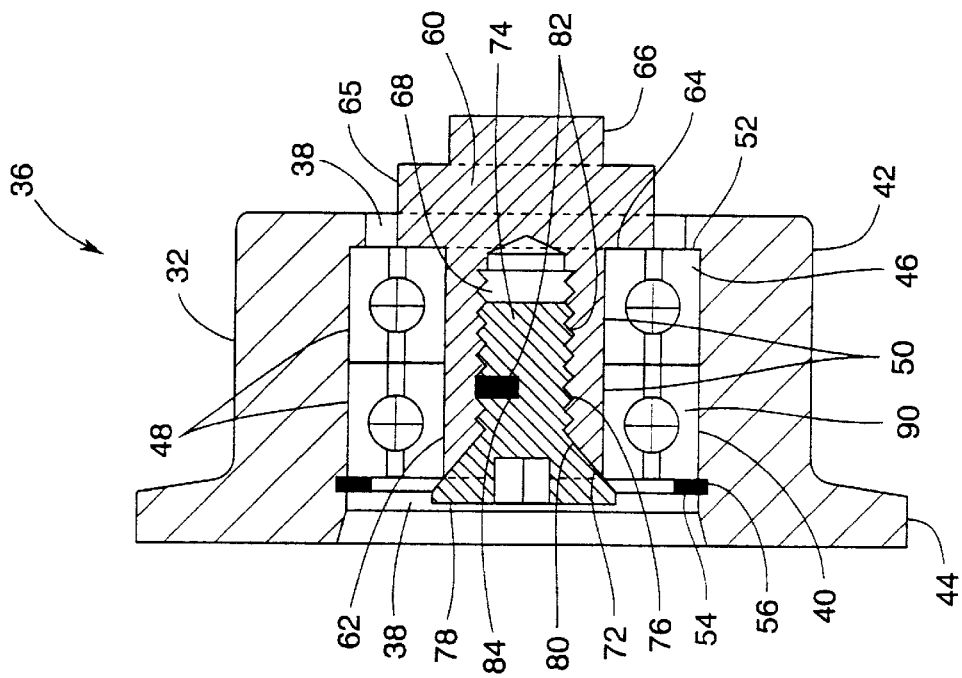
FIG. 6C is a cross sectional view of a wheel and axle assembly according to an embodiment of the invention.
Figure 6D:
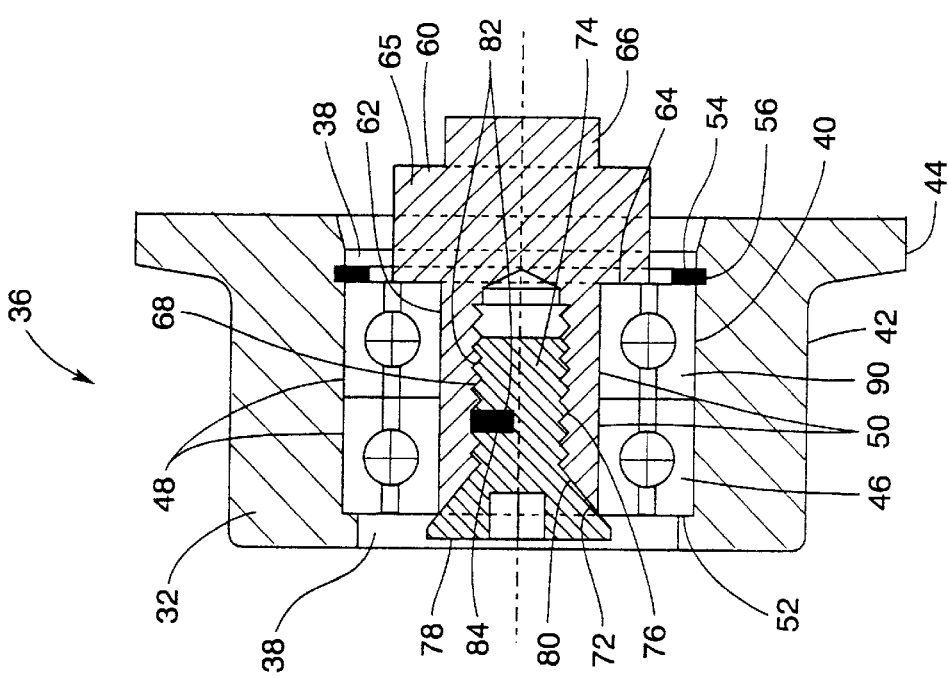
FIG. 6D is a cross section view of the wheel and axle assembly of FIG. 4B.

In some extremely heavy duty applications, it may be necessary to include an additional bearing with each wheel to enable a material handling cart to carry particularly heavy loads. For example, FIGS. 6C and 6D are cross sectional views of wheel and axle assemblies 36 each having a second bearing 90 positioned between the first bearing 46 and snap ring 54. An exploded view of the wheel and axle assembly 36 of FIG. 6D is depicted in FIG. 4B. In each of these depicted embodiments, the second bearing 90 is substantially identical to the first bearing 46, while the axial length of the bearing engagement surface 62 of the axle 60 is extended to allow for engagement with two bearings 46. In these configurations, the presence of the second bearing 90 allows the wheel and axle assembly 36 to bear approximately twice the load of the wheel and axle assembly 36 of FIG. 6A and 6B. In each of these two embodiments, the axial length of the barrel portion 65 of the axle 60 can be specified to permit an appropriate amount of clearance to exist between the bearing engagement surface 62 of the axle 60 and the edge of the inner hole 38 of the wheel 32 to permit unobstructed attachment to a cart 26.

Those skilled in the art will recognize that the various features of this invention described above can be used in various combinations with other elements without departing from the scope of the invention. Thus, the appended claims are intended to be interpreted to cover such equivalent wheel and axle assemblies which do not depart from the spirit and scope of the invention.

What is claimed is:

1. A wheel and axle assembly for a material handling cart comprising:
   a wheel having an inner hole extending therethrough defined by an inner wheel surface;

a first bearing positioned within said inner hole, said first bearing having an outer race and an inner race which rotates with respect to said outer race, said outer race engaging said inner wheel surface;

a snap ring positioned within said inner hole to lock said first bearing in position within said inner hole;

an axle having a bearing engagement surface, a shoulder adjacent said bearing engagement surface and having an axial radius greater than that of said bearing engagement surface, and a load-bearing surface, said inner race engaging said bearing engagement surface of said axle, said axle extending at least partially through said inner race of said bearing;

said axle having a bolt cavity, said bolt cavity having female cavity threads within it and an inside tapered portion at one end of said female cavity threads;

a bolt having male bolt threads, a head, a tapered portion at least partially positioned on said head, and a locking material within at least a portion of said male bolt threads, said head having a head diameter that is greater than the inside diameter of said inner race;

said male bolt threads sized to engage said female cavity threads within said bolt cavity until said bolt is positioned within said bolt cavity so that said tapered portion of said bolt engages said inside tapered portion of said bolt cavity, at which position said head of said bolt engages said inner race to axially lock said first bearing against said shoulder of said axle; and said locking material securing said male bolt threads in position with respect to said female cavity threads within said bolt cavity to maintain said outside tapered portion of said bolt in engagement with said inside tapered portion of said bolt cavity.

2. The wheel and axle assembly of claim 1 in which said wheel further comprises an outer rolling surface and a positioning flange extending outward from said outer rolling surface.

3. The wheel and axle assembly of claim 1 in which said locking material comprises a locking strip, said bolt having a strip cavity positioned at about said male bolt threads, said locking strip being positioned within said strip cavity and configured to engage and lock said female cavity threads of said bolt cavity when said bolt engages said inside tapered portion of said bolt cavity.

4. The wheel and axle assembly of claim 1 in which said locking material comprises a locking strip, said locking strip comprising nylon, said bolt having a strip cavity positioned at about said male bolt threads, said locking strip being positioned within said strip cavity and configured to engage and lock said female cavity threads of said bolt cavity when said bolt engages said inside tapered portion of said bolt cavity.

5. The wheel and axle assembly of claim 1 in which said locking material comprises a chemical locking compound, said locking compound being applied to said male bolt threads and configured to engage said female cavity threads of said bolt cavity when said bolt is screwed into said bolt cavity.

6. The wheel and axle assembly of claim 1 further comprising a bearing notch positioned within said inner hole of said wheel, said first bearing being positioned to engage and to be locked into position against said first bearing notch when said first bearing is positioned within said hole and locked into position with said snap ring.

7. The wheel and axle assembly of claim 1 further comprising a snap ring notch positioned within said inner hole of said wheel, said snap ring being configured to engage and lock within said snap ring notch when said snap ring locks said first bearing in position within said inner hole.

8. The wheel and axle assembly of claim 1 further comprising a second bearing, said second bearing being positioned within said inner hole adjacent said first bearing and being locked into position between said first bearing and said snap ring, said second bearing being in engagement with said bearing engagement surface of said axle.

9. A wheel and axle assembly for a material handling cart comprising:

a wheel having an inner hole extending therethrough defined by an inner wheel surface, said wheel further comprising an outer rolling surface and a positioning flange extending outward from said outer rolling surface;

a first bearing positioned within said inner hole of said wheel, said first bearing having an outer race and an inner race which rotates with respect to said outer race, said outer race engaging said inner wheel surface;

a snap ring positioned within said inner hole to lock said first bearing in position within said inner hole;

a snap ring notch positioned within said inner hole of said wheel, said snap ring being configured to engage and lock within said snap ring notch when said snap ring locks said first bearing in position within said inner hole;

a bearing notch positioned within said inner hole of said wheel, said first bearing being positioned to engage and to be locked into position against said first bearing notch when said first bearing is positioned within said hole and locked into position with said snap ring;

an axle having a bearing engagement surface, a shoulder adjacent said bearing engagement surface having an axial radius greater than that of said bearing engagement surface, and a load-bearing surface, said inner race engaging said bearing engagement surface of said axle, said axle extending at least partially through said inner race of said bearing;

said axle having a bolt cavity, said bolt cavity having female cavity threads within it and an inside tapered surface at one end of said female cavity threads;

a bolt having male bolt threads, a head, a tapered portion at least partially positioned on said head, and a locking material comprising a nylon strip positioned within a strip cavity located at about said male bolt threads, said head having a head diameter that is greater than the inside diameter of said inner race;

said male bolt threads sized to engage said female cavity threads within said bolt cavity until said bolt is positioned within said bolt cavity so that said tapered portion of said bolt engages said inside tapered portion of said bolt cavity, at which position said head of said bolt engages said inner race to axially lock said first bearing against said shoulder of said axle; and said locking material configured to engage and lock said female cavity threads of said bolt cavity when said outside tapered portion of said bolt engages said inside tapered portion of said bolt cavity, securing said male bolt threads in position with respect to said female cavity threads within said bolt cavity to maintain said outside tapered portion of said bolt in engagement with said inside tapered portion of said bolt cavity.

* * * * *